United States Patent
Xu et al.

(10) Patent No.: US 10,198,104 B2
(45) Date of Patent: Feb. 5, 2019

(54) ADVANCED SUPER DIMENSION SWITCH ARRAY SUBSTRATE AND METHOD FOR MANUFACTURING THE SAME, DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Rui Xu, Beijing (CN); Xiaochuan Chen, Beijing (CN); Haisheng Wang, Beijing (CN); Xue Dong, Beijing (CN); Lei Wang, Beijing (CN); Shengji Yang, Beijing (CN); Yingming Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 288 days.

(21) Appl. No.: 15/109,212

(22) PCT Filed: Jan. 4, 2016

(86) PCT No.: PCT/CN2016/070008
§ 371 (c)(1),
(2) Date: Jun. 30, 2016

(87) PCT Pub. No.: WO2017/008472
PCT Pub. Date: Jan. 19, 2017

(65) Prior Publication Data
US 2018/0196556 A1   Jul. 12, 2018

(30) Foreign Application Priority Data
Jul. 14, 2015 (CN) .......................... 2015 1 0412185

(51) Int. Cl.
G06F 3/041 (2006.01)
G06F 3/044 (2006.01)
(Continued)

(52) U.S. Cl.
CPC .......... G06F 3/0412 (2013.01); G02F 1/1368 (2013.01); G02F 1/13338 (2013.01);
(Continued)

(58) Field of Classification Search
CPC .... G06F 3/044; G06F 3/0416; G02F 1/13338; G09G 3/3655
See application file for complete search history.

(56) References Cited

U.S. PATENT DOCUMENTS

2014/0175444 A1* 6/2014 Yamazaki ........... G02F 1/13454
257/59
2014/0327840 A1  11/2014 Kim et al.
(Continued)

FOREIGN PATENT DOCUMENTS

CN  102629060 A  8/2012
CN  103698949 A  4/2014
(Continued)

OTHER PUBLICATIONS

Second Chinese Office Action regarding Application No. 201510412185.1 dated Jan. 3, 2018. Translation provided by Dragon Intellectual Property Law Firm.
(Continued)

*Primary Examiner* — Abbas I Abdulselam
(74) *Attorney, Agent, or Firm* — Harness, Dickey & Pierce, P.L.C.

(57) ABSTRACT

The present disclosure provides an ADS array substrate, a method for manufacturing the same and a display device. The common electrodes of the ADS array substrate serves as touch electrodes, and each touch electrode is electrically connected to a corresponding signal line. In a touch time
(Continued)

period of a time period for displaying one frame of image, it is detected whether a self-capacitance of the touch electrode is changed via a corresponding signal line and then a touch position is determined. Each signal line corresponds to a unique touch electrode, then a detection signal obtained via each signal line corresponds to a unique touch electrode, so even though a plurality of touch electrodes are touched, the corresponding touches positions may be determined exactly.

11 Claims, 9 Drawing Sheets

(51) Int. Cl.
| | |
|---|---|
| G06F 3/045 | (2006.01) |
| G02F 1/1333 | (2006.01) |
| G02F 1/1343 | (2006.01) |
| G02F 1/1362 | (2006.01) |
| G02F 1/1368 | (2006.01) |

(52) U.S. Cl.
CPC .. *G02F 1/134309* (2013.01); *G02F 1/136227* (2013.01); *G02F 1/136286* (2013.01); *G06F 3/041* (2013.01); *G06F 3/044* (2013.01); *G06F 3/045* (2013.01); *G06F 3/0416* (2013.01); *G02F 2001/134372* (2013.01); *G02F 2201/121* (2013.01); *G06F 2203/04103* (2013.01)

(56) References Cited

U.S. PATENT DOCUMENTS

| | | | | |
|---|---|---|---|---|
| 2014/0362031 A1* | 12/2014 | Mo | ......................... | G09G 3/36 345/174 |
| 2016/0041438 A1 | 2/2016 | Hu et al. | | |
| 2016/0048233 A1 | 2/2016 | Wang et al. | | |
| 2016/0274716 A1 | 9/2016 | Liu et al. | | |
| 2016/0294386 A1 | 10/2016 | Yang et al. | | |
| 2016/0334934 A1* | 11/2016 | Mo | ...................... | G02F 1/13338 |
| 2017/0017333 A1 | 1/2017 | Wang et al. | | |
| 2017/0139534 A1* | 5/2017 | Hao | ........................ | G06F 3/044 |

FOREIGN PATENT DOCUMENTS

| | | | |
|---|---|---|---|
| CN | 104020893 | A | 9/2014 |
| CN | 104020907 | A | 9/2014 |
| CN | 104022127 | A | 9/2014 |
| CN | 104216564 | A | 12/2014 |
| CN | 204203592 | U | 3/2015 |
| CN | 104615324 | A | 5/2015 |
| CN | 104698698 | A | 6/2015 |
| CN | 104699313 | A | 6/2015 |
| CN | 105159486 | A | 12/2015 |

OTHER PUBLICATIONS

First Office Action regarding Chinese Application No. 201510412185.1, dated Jul. 25, 2017. Translation provided by Dragon Intellectual Property Law Firm.

Written Opinion of the International Searching Authority and International Search Report regarding International Application No. PCT/CN2016/070008, dated Mar. 24, 2016. Translation provided by Dragon Intellectual Property Law Firm.

* cited by examiner

ADVANCED SUPER DIMENSION SWITCH ARRAY SUBSTRATE AND METHOD FOR MANUFACTURING THE SAME, DISPLAY DEVICE

CROSS-REFERENCE TO RELATED APPLICATIONS

This application is the U.S. National Phase of PCT Application No. PCT/CN2016/070008 filed on Jan. 4, 2016, which claims a priority to Chinese Patent Application No. 201510412185.1 filed on Jul. 14, 2015, the disclosures of which are incorporated in their entirety by reference herein.

TECHNICAL FIELD

The present disclosure relates to the field of display technology, and in particular to an advanced super dimension switch (ADS) array substrate and a method for manufacturing the same and a display device.

BACKGROUND

In the touch screen technology, a capacitive touch screen is of a long service life and a high transmittance and supports multi-point touch, as compared with a resistive touch screen. In addition, the capacitive touch screen can perfectly restrain the noise and the earth stray capacity. Therefore, the capacitive touch screen has become one of the hot spots in the touch screen manufacture. The capacitive touch screen includes a self-capacitance touch screen and a mutual-capacitance touch screen. The self-capacitance touch screen needs only one layer of touch electrodes, and a touch action can be detected when a self capacitance of a certain touch electrode is changed, therefore the self-capacitance touch screen has a simple structure and is easy to be implemented.

In recent years, the displayer is becoming thicker. In an in-cell type touch displayer, touch electrodes of the touch screen are embedded into the display screen, thereby thinning the displayer, reducing a manufacturing cost thereof significantly and being favored by the panel manufacturers.

SUMMARY

An ADS array substrate, a method for manufacturing the same and a display device are provided by the present disclosure, thereby realizing an in-cell touch display.

To achieve the above object, an ADS array substrate is provided in some embodiments of the present disclosure, including a display region and a non-display region at a periphery of the display region. The display region of the array substrate includes a plurality of pixel units, and each of the pixel units includes a common electrode and a pixel electrode. A time period for displaying one frame of image of the array substrate includes a display time period and a touch time period. The common electrodes further serve as a plurality of touch electrodes, and each of the touch electrodes corresponds to a plurality of ones of the common electrodes which are electrically connected to each other. The array substrate further includes a plurality of signal lines; the signal lines are electrically connected to the touch electrodes in a one-to-one manner. Each of the signal lines is configured to transmit a common voltage signal to the corresponding touch electrode within the display time period of the time period for displaying one frame of image; and each of the signal lines is further configured to detect whether there is a change of a self-capacitance of the corresponding touch electrode within the touch time period of the time period for displaying one frame of image.

Optionally, the array substrate is a thin film transistor array substrate, and includes gate lines and data lines which are intersected to each other and configured to define regions of the pixel units. Each of the pixel units further includes a thin film transistor. The signal lines, the gate lines, and gate electrodes of the thin film transistors are at an identical layer and made of an identical material, or, the signal lines, the data lines, source electrodes and drain electrodes of the thin film transistors are at an identical layer and made of an identical material.

Optionally, each of the signal lines is lap-jointed to the corresponding touch electrode and electrically contacts the corresponding touch electrode.

Optionally, the array substrate includes: a base substrate; the common electrodes on the base substrate; the gate lines, the signal lines and the gate electrodes of the thin film transistors, which are at an identical layer and made of an identical material, where each of the signal lines is lap-jointed to the corresponding touch electrode; a gate insulation layer covering the gate lines, the signal lines and the gate electrodes; a pattern of an active layer on the gate insulation layer; the data lines, the source electrodes and drain electrodes of the thin film transistors, where in each of the thin film transistors, the source electrode and the drain electrode are lap-jointed to the active layer at two sides thereof opposite to each other; a passivation layer covering the thin film transistors, where the passivation layer includes via-holes; the pixel electrodes on the passivation layer and in electrical connection with the drain electrodes via the via-holes in the passivation layer.

Optionally, the array substrate further includes an insulation layer between the signal lines and the touch electrodes. Each of the signal lines is electrically connected to the corresponding touch electrode via a via-hole in the insulation layer.

Optionally, a portion of each of the signal lines in the display region is parallel to the gate lines or the data lines.

Optionally, each of the common electrodes is a plate electrode, and each of the pixel electrodes is a slot electrode.

Optionally, each of the pixel electrodes includes a plurality of slots; the slots include a plurality of first slots which are parallel to each other and a plurality of second slots which are parallel to each other. An angle is defined between the gate lines and the first slots, and between the gate lines and the second slots. In each of the pixel electrodes, the first slots and the second slots are symmetrically distributed at two sides of a center axis of each of the pixel electrodes which is parallel to the gate lines.

Optionally, the signal lines extend from the display region to the non-display region; the array substrate is of a rectangular structure, and the signal lines extend from the display region to a side of a longer edge of the array substrate.

A method for manufacturing the ADS array substrate hereinabove is further provided in some embodiments of the present disclosure. The array substrate includes a display region and a non-display region at a periphery of the display region. The method includes a step of forming a plurality of pixel units in the display region of the array substrate with each of the pixel units including a common electrode and a pixel electrode. A time period for displaying one frame of image of the array substrate includes a display time period and a touch time period. The common electrodes further serve as a plurality of touch electrodes, and each of the touch electrodes corresponds to a plurality of ones of the common electrodes which are electrically connected to each other.

The method further includes: forming a plurality of signal lines with the signal lines in electrical connection with the touch electrodes in a one-to-one manner. Each of the signal lines is configured to transmit a common voltage signal to the corresponding touch electrode within the display time period of the time period for displaying one frame of image; and each of the signal lines is further configured to detect whether there is a change of a self-capacitance of the corresponding touch electrode within the touch time period of the time period for displaying one frame of image.

Optionally, the array substrate is a thin film transistor array substrate, and includes gate lines and data lines which are intersected to each other and configured to define regions of the pixel units. Each of the pixel units further includes a thin film transistor. The step of forming a plurality of signal lines includes: patterning an identical gate metal layer to form the signal lines, gate lines, and gate electrodes of the thin film transistors, or patterning an identical source-drain metal layer to form the signal lines, data lines, source electrodes and drain electrodes of the thin film transistors.

Optionally, the step of forming a plurality of pixel units includes: forming a transparent conductive layer and patterning the transparent conductive layer to form a plurality of common electrodes. The step of forming a plurality of signal lines includes: forming a gate metal layer on the common electrodes and patterning the gate metal layer to form a pattern including the signal lines, gate lines and gate electrodes of thin film transistors. Each of the signal lines is lap-jointed to the corresponding touch electrode and in electrical connection with the corresponding touch electrode.

Optionally, the step of forming a plurality of pixel units includes: providing a base substrate; forming a plurality of common electrodes on the base substrate. The step of forming a plurality of signal lines includes: forming a gate metal layer on the common electrodes, and patterning the gate metal layer to form a plurality of gate lines, a plurality of signal lines and gate electrodes of thin film transistors, where each of the signal lines is lap-jointed to the corresponding touch electrode. The method further includes: forming a gate insulation layer covering the gate lines, the signal lines and the gate electrodes; forming a pattern of an active layer on the gate insulation layer; forming a source-drain metal layer on the active layer, and patterning the source-drain metal layer to form a plurality of data lines, source electrodes and drain electrodes of the thin film transistors, where in each of the thin film transistors, the source electrode and the drain electrode are lap-jointed to the active layer at two ends thereof opposite to each other; forming a passivation layer covering the thin film transistors, and patterning the passivation layer to form via-holes therein; forming the pixel electrodes on the passivation layer. The pixel electrodes are electrically connected to the drain electrodes via the via-holes in the passivation layer.

Optionally, the step of forming a plurality of pixel units includes: forming a transparent conductive layer and patterning the transparent conductive layer to form a plurality of common electrodes. The method further includes: forming an insulation layer on the common electrodes and patterning the insulation layer to form via-holes therein. The step of forming a plurality of signal lines includes: forming a gate metal layer on the insulation layer, and patterning the gate metal layer to form a pattern including the signal lines, gate lines and gate electrodes of thin film transistors. Each of the signal lines is electrically connected to the corresponding touch electrode via the via-hole in the insulation layer.

A display device is further provided in some embodiments of the present disclosure, including the ADS array substrate hereinabove.

According to the solutions of the present disclosure, the common electrodes further serves as the touch electrodes, thereby realizing an in-cell type touch screen and thinning the display device. In addition, the "ghost points" occurring in the self-capacitance touch detection of the related art may be avoided, therefore a detection time length is shortened and a touch sensitivity is improved.

BRIEF DESCRIPTION OF THE DRAWINGS

In order to make the technical solutions in the related art or the embodiments of present disclosure more apparent, the drawings related to the embodiments or the related art will be described hereinafter briefly. Obviously, the following drawings merely relate to a part of, rather than all of, the embodiments of the present disclosure, and based on these drawings, a person skilled in the art may, without any creative effort, obtain the other embodiments.

DETAILED DESCRIPTION

Figure 1:
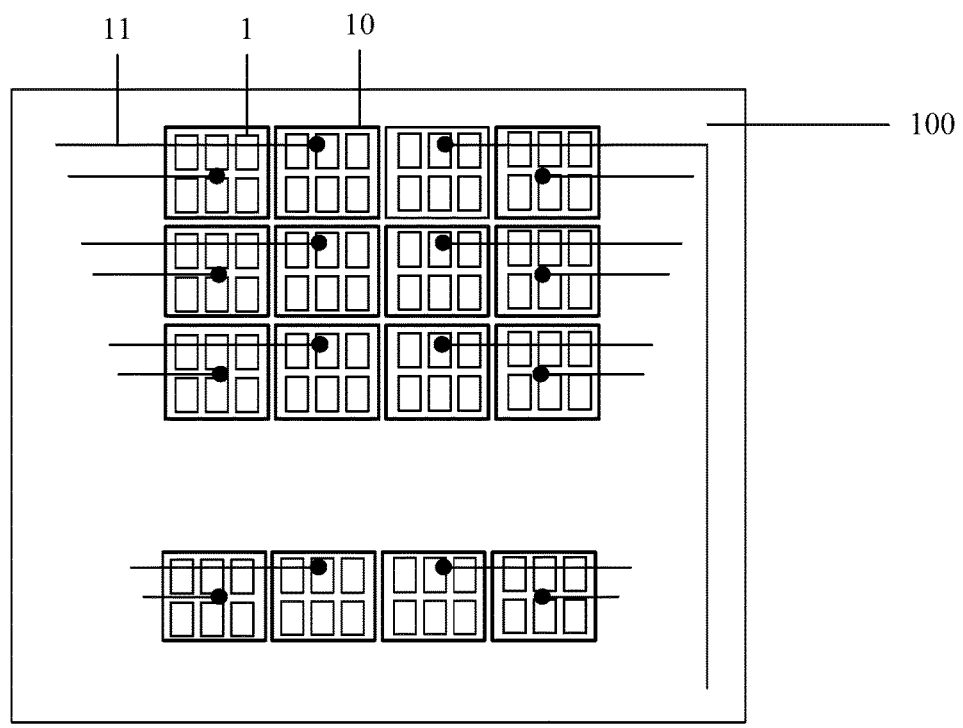
FIG. 1 is a schematic view showing an ADS array substrate in some embodiments of the present disclosure.

First, the concept and working principle related in the present disclosure will be illustrated hereinafter, and then the technical solution of the present disclosure will be described.

A main structure of a thin film transistor liquid crystal display (TFT-LCD) is a liquid crystal panel. The liquid crystal panel includes a thin film transistor array substrate and a color filter substrate that are oppositely arranged to form a cell. Liquid crystal molecules are filled between the array substrate and the color filter substrate. The array substrate includes a plurality of gate lines and a plurality of data lines which are configured to define regions of pixel units. Each pixel unit includes a thin film transistor, a pixel electrode and a common electrode. The thin film transistors are turned on via the gate lines, pixel voltages applied on the data lines are transmitted to the pixel electrodes via the thin film transistors, such that an electric field which drives the liquid crystal molecules to deflect by a certain angle is formed between the common electrodes and the pixel electrodes, thereby to realize a grayscale display. A color filter layer on the color filter substrate is for a color display. The TFT-LCD is characterized in small size, low power consumption and being nonradiative, which has been developed rapidly in recent years, and it has become a predominate product in the recent flat-panel display market.

In an ADS display mode, common electrodes and pixel electrodes are both formed on an array substrate, and a multi-dimension electric field is formed of an electric filed formed at edges of slot electrodes in the same plane and an electric filed formed between a slot electrode layer and a plate electrode layer, so as to make all the aligned liquid crystal molecules between the slot electrodes and above the electrodes in a liquid crystal cell to rotate, thereby improving working efficiency of liquid crystal and transmittance efficiency. By the ADS technology, an image quality of the TFT-LCD may be improved and the ADS is of a high resolution, a high transmittance, a low power consumption, a wide viewing angle, a high aperture ratio, a low aberration, and it is free of push Mura.

A large-size ADS type TFT-LCD adopts an A-ADS type pixel structure, of which pixel electrodes are slot electrodes, common electrodes are plate electrodes. The pixel electrodes are at a side of the common electrodes adjacent to liquid crystal molecules, and slots of the pixel electrodes are parallel to gate lines and extend horizontally. The A-ADS type pixel structure is of good light efficiency, a small coupling capacitance between gate lines and date lines and a small load, and it is applicable to a large-size ADS type TFT-LCD.

A capacitive type touch detection includes a self-capacitance touch detection and a mutual-capacitance touch detection. The self-capacitance touch detection needs only one layer of touch electrodes, and a touch action can be detected when a self capacitance of a certain touch electrode is changed, therefore the self-capacitance touch detection needs a simple structure and is easy to be implemented. The self-capacitance of the touch electrode is a capacitance to earth of the touch electrode.

The touch electrodes of the self-capacitance touch screen in the related art are arranged in a two-dimensional array, and a touch detection method thereof may include: transmitting charges through a change of the self-capacity of a single touch electrode and detecting the change of the self-capacity by grounding one end of the touch electrode and connecting the other end thereof to an energizing circuit or a sampling circuit. To be specific, the method includes detecting in sequence the touch electrode array horizontally and longitudinally, determining an horizontal coordinate and a longitudinal coordinate of a touch point based on the change of the self-capacity due to the touch action, and determining a touch position based on a plane coordinates combined by the horizontal coordinate and the longitudinal coordinate. When there is only one touch point, the combined coordinate is unique, by which a touch position may be positioned accurately. However, when there are two touch points, there will be two horizontal coordinates and two longitudinal coordinates respectively, therefore there will be four groups of coordinates, where only two groups are related to actual touch points and the other two groups are namely "ghost points", and then a multi-point touch will not be realized as a result.

The present disclosure will be described hereinafter in conjunction with the drawings and embodiments. The following embodiments are for illustrative purposes only, but shall not be used to limit the scope of the present disclosure.

Figure 2:
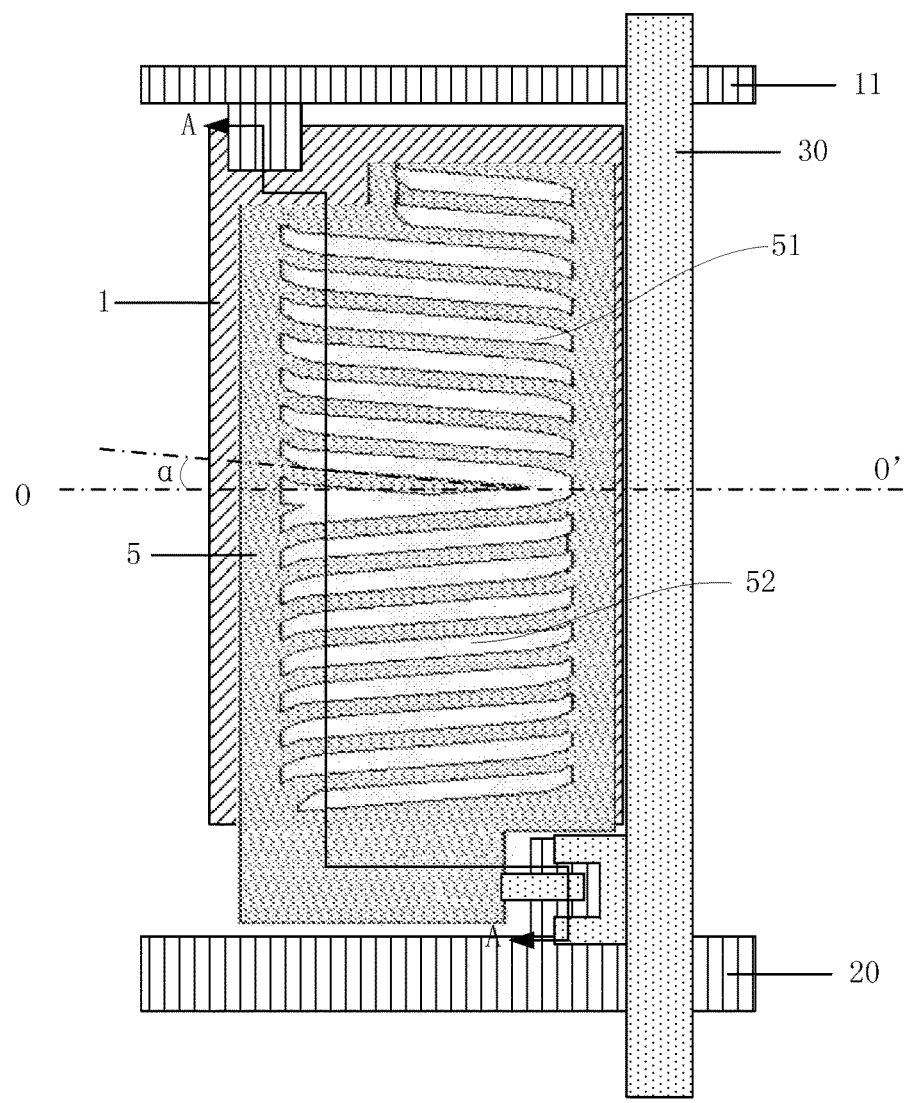
FIG. 2 is a schematic view showing a pixel unit of the ADS array substrate shown in FIG. 1, which shows a connection relationship between a signal line and a corresponding touch electrode.
Figure 3:
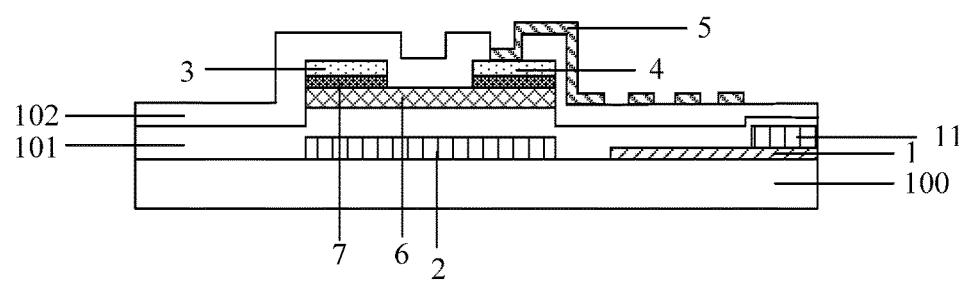
FIG. 3 is a section view of the pixel unit shown in FIG. 2 taken along a line A-A.

FIG. 1 is a schematic view showing an ADS array substrate in some embodiments of the present disclosure. FIG. 2 is a schematic view showing a pixel unit of the ADS array substrate shown in FIG. 1. FIG. 3 is a section view of the pixel unit shown in FIG. 2 taken along a line A-A.

Referring to FIGS. 1-3, an ADS array substrate is provided in some embodiments of the present disclosure, including a display region and a non-display region at a periphery of the display region. The display region of the array substrate includes a plurality of pixel units, and each pixel units includes a common electrode 1 and a pixel electrode 5. The common electrodes 1 further serve as a plurality of touch electrodes 10, and each touch electrode 10 corresponds to a plurality of common electrodes 1 which are electrically connected to each other, so as to embed a touch screen into the a display panel, thereby thinning the touch display device.

The array substrate further includes a plurality of signal lines 11. Each signal line 11 is electrically connected to a corresponding touch electrode 10, as shown in FIG. 1. A time period for displaying one frame of image of the array substrate includes a display time period and a touch time period. In the display time period of the time period for displaying one frame of image, a common voltage signal is transmitted to the touch electrode 10 via a corresponding signal line 11, so as to provide a reference voltage for the common electrode 1, and an electric field which drives the liquid crystal molecules to deflect by a certain angle is formed between the common electrodes 1 and the pixel electrodes 5, as shown in FIGS. 2 and 3. In the touch time period of the time period for displaying one frame of image, it is detected whether a self-capacitance of the touch electrode 10 is changed via a corresponding signal line 11 and then a touch position is determined. In addition, each signal line corresponds to a unique touch electrode 10, so a detection signal obtained via each signal line 11 corresponds to a unique touch electrode 10. Even though a plurality of touch electrodes 10 are touched, the corresponding touch positions may be determined exactly, thereby avoiding the "ghost points" occurring in the self-capacitance touch detection of the related art. In addition, the self-capacity of all the touch electrodes 10 may be detected simultaneously. As compared with the touch detection in the related art in which the horizontal touch electrodes and the longitudinal touch electrodes in the touch electrodes are detected in sequence, therefore a detection time length is shortened and a touch sensitivity is improved.

The common electrode 1 may be of a regular shape, e.g., the common electrode 1 may be rectangular, rhombic, triangular, rounded or elliptic, or the common electrode 1 may be of an irregular shape, which is not limited herein. An amount of the common electrodes 1 which correspond to each touch electrode 10 is not limited herein, as long as a requirement of accuracy of the touch detection can be satisfied.

To be specific, the ADS array substrate may be a thin film transistor array substrate, which includes a plurality of gate lines 20 and a plurality of data lines 30 configured to define regions of the pixel units. Each pixel unit further includes a thin film transistor. Each common electrode 1 is merely located at a region of pixel units and is not overlapped with any gate line 20 or data line 30, thereby reducing a coupling capacity among the common electrodes 1, the gate lines 20 and the data lines 30, and then a detection response time length may be reduced furthest when the common electrodes 1 serve as the touch electrodes 10.

Optionally, the signal lines 11 and gate electrodes 2 of the thin film transistors are at an identical layer and made of an identical material, or the signal lines 11, source electrodes 3 and drain electrodes 4 of the thin film transistors are at an identical layer and made of an identical material. That is, the signal lines 11 and the gate electrodes 2 of the thin film transistors are formed simultaneously by patterning the same gate metal layer, or the signal lines 11 and the source electrodes 3 and the drain electrodes 4 of the thin film transistors are formed simultaneously by patterning the same source-drain metal layer, where an independent process of forming the signal lines 11 is saved, thereby reducing the manufacturing cost. A resistivity of a transparent conductive material is larger than resistivity of a gate metal and source-drain metal, so generally the signal lines is not manufactured by a transparent conductive layer.

The signal lines 11 need to extend from the display region to the non-display region, so the signal lines 11 are generally distributed as uniform as possible, and the wirings thereof are as short and narrow as possible. To be specific, portions of the signal lines 11 at the display region are parallel to the gate lines 20 or the data lines 30, and portions of the signal lines 11 at the non-display region may be parallel to each other or arranged fanwise. When the array substrate is rectangular, the signal lines 11 extend from the display region to a side of a longer edge of the array substrate, so as to shorten the signal lines 11, as shown in FIG. 1.

Figure 16:
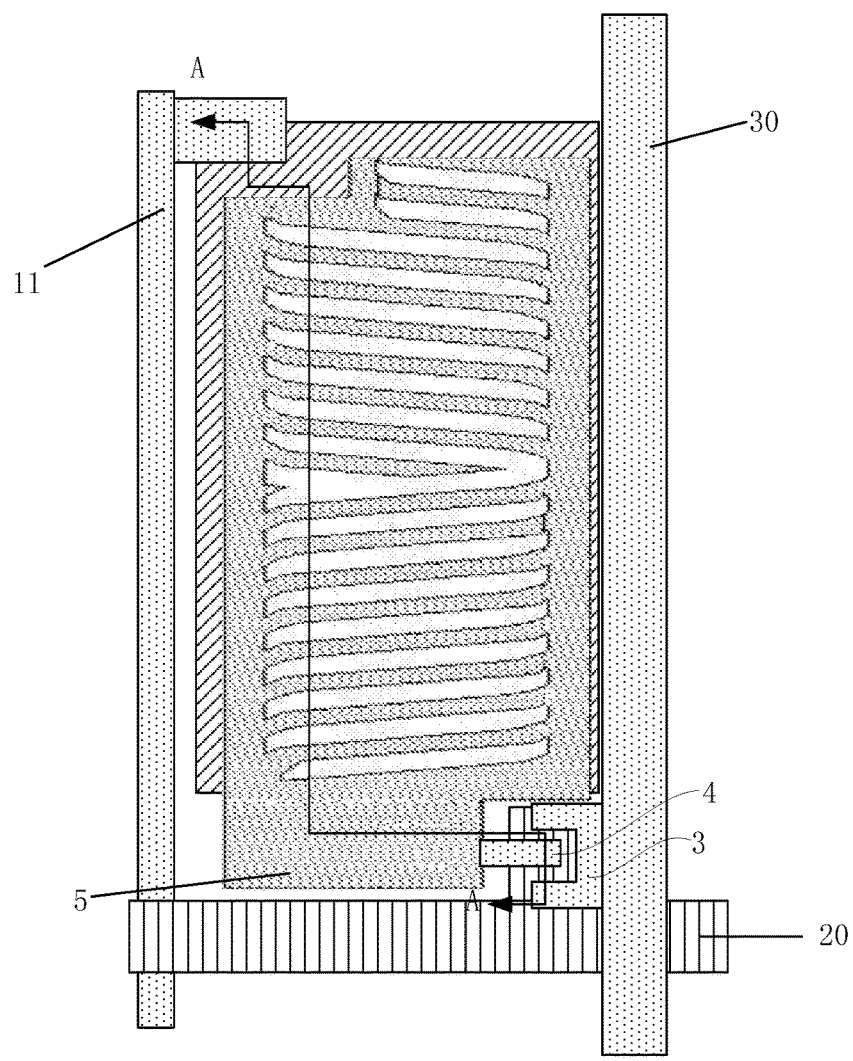
FIG. 16 is a schematic view showing a pixel unit of the ADS array substrate shown in FIG. 1, which shows that a signal line is parallel to a data line.
Figure 17:
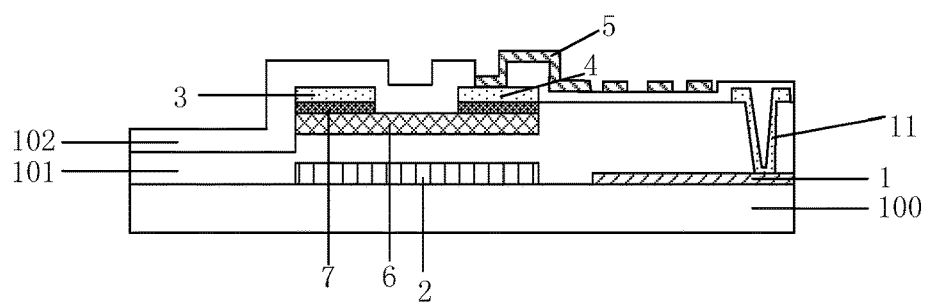
FIG. 17 is a section view of the pixel unit shown in FIG. 16 taken along a line A-A.

In some embodiments of the present disclosure, the signal lines 11 and the gate electrodes 1 of the thin film transistors are at an identical layer and made of an identical material, and the portions of the signal lines 11 at the display region are parallel to the gate lines 20 and the gate line 20 is spaced apart from the signal line 11 by a certain interval, so as to make the two insulated from each other. Alternatively, as shown in FIGS. 16 and 17, the signal lines 11, the source electrodes 3 and the drain electrodes 4 of the thin film transistors are at an identical layer and made of an identical material, and the portions of the signal lines 11 at the display region are parallel to the date lines 30 and the data line 30 is spaced apart from the signal line 11 by a certain interval, so as to make the two insulated from each other.

According to the embodiments of the present disclosure, the common electrodes further serves as the touch electrodes of the self-capacitance touch screen, thereby realizing an in-cell type touch screen and thinning the display device. In addition, it is able to avoid the "ghost point" which occurs in the self-capacitance touch screen of the related art, thereby shortening the touch detection time length and improving the touch sensitivity.

In some embodiments of the present disclosure, in the ADS array substrate, especially the A-ADS array substrate in the large-size display device, the common electrodes are plate electrodes, and the pixel electrodes 5 are slot electrodes which include a plurality of slots and have good light efficiency, a small coupling capacity and a small load, as shown in FIGS. 2 and 3. Optionally, as shown in FIG. 2, in the A-ADS type thin film transistor array substrate, the slots in the pixel electrode 5 include a plurality of first slots 51 which are parallel to each other and a plurality of second slots 52 which are parallel to each other. There exits an angle α (generally 2°≤|α|≤5°) between the gate lines 20 and each of the first slots 51 and second slots 52. The first slots 51 and the second slots 52 are symmetrically distributed at two sides of a center axis 00' of each pixel electrode which is parallel to the gate line 20, such that a first electric field is formed between a portion of the pixel electrode 5 including the first slots 51 and the common electrode 1, and a second electric field is formed between a portion of the pixel electrode 5 including the second slots 52 and the common electrode 1. A direction of the first electric field is different from that of the second electric field, thereby enlarging the viewing angle of the display device.

Each touch electrode 10 corresponds to a plurality of electrically-connected common electrodes 1, so an electric connection of one signal line 11 and one touch electrode 10 is equivalent to an electric connection of the signal line 11 and at least one of the common electrodes 1 corresponding to the touch electrode 10. To be specific, the signal line 11 is electrically connected to one of the common electrodes 1 corresponding to the touch electrode 10, so as to simplify the circuit. A plurality of common electrodes 1 corresponding to each touch electrode 10 may be electrically connected to each other via connection lines (not shown in the drawings). To be specific, the connection lines and the common electrodes may be formed simultaneously, i.e., they are formed as an integrative structure.

An electric connection of the signal line 11 and the touch electrode 10 will be described hereinafter by taking an example that the signal line 11 is electrically connected to one of the common electrodes 1 corresponding to the touch electrode 10.

In some embodiments of the present disclosure, as shown in FIGS. 2 and 3, a first film layer by which the touch electrodes 10 are formed, i.e., a first film layer by which the common electrodes 1 are formed, is adjacent to a second film layer by which the signal lines 11 are formed, and there is no other layer between the first and the second film layers. The signal line 11 is lap-jointed to the common electrode 1 corresponding to the touch electrode 10, so as to electrically connect the signal line 11 to the corresponding touch electrode 10. The manufacturing process is shown in FIGS. 4-7.

Figure 8:
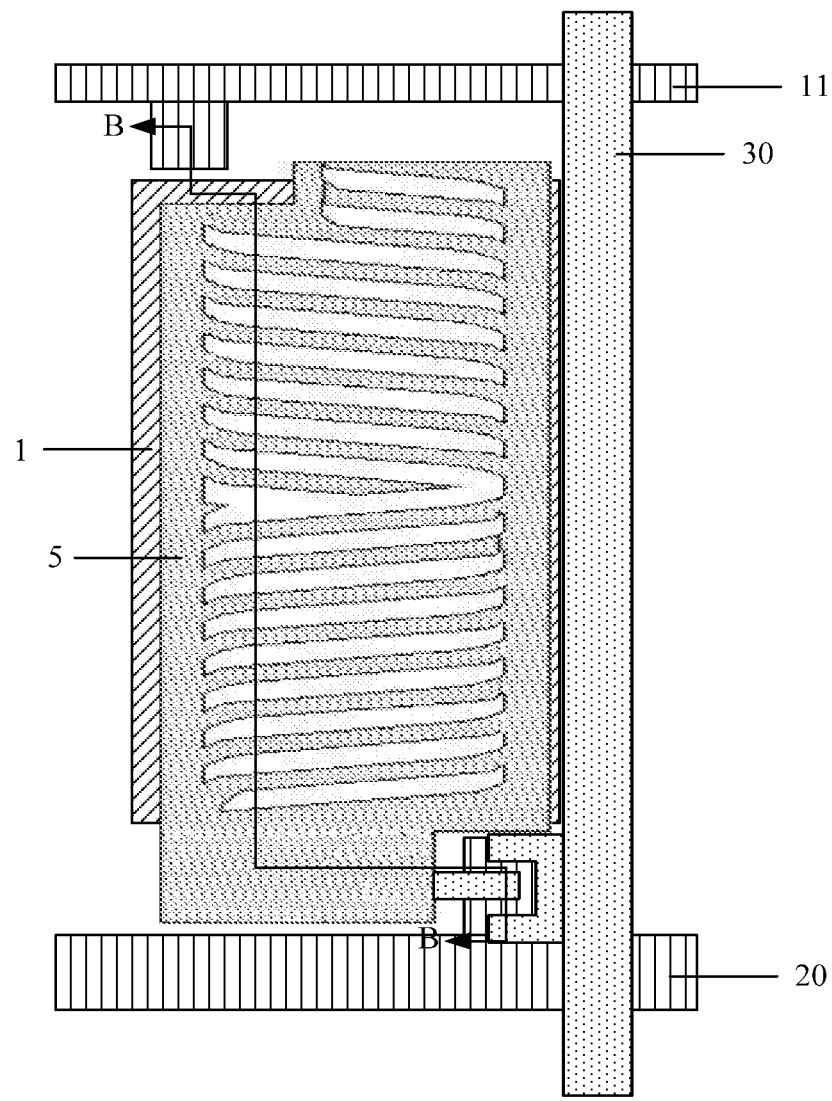
FIG. 8 is a schematic view showing another pixel unit of the ADS array substrate shown in FIG. 1, which shows a connection relationship between a signal line and a non-corresponding touch electrode.
Figure 9:
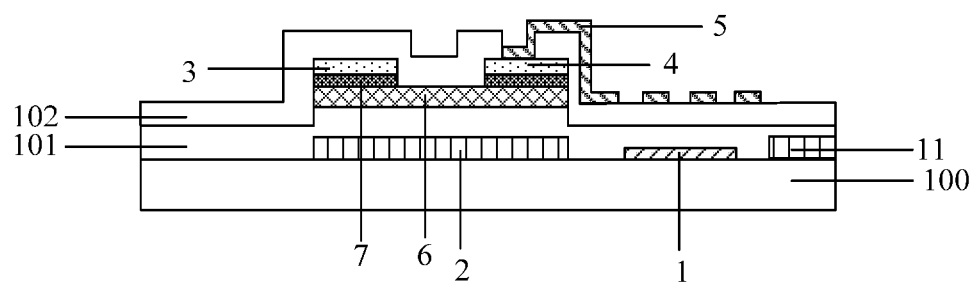
FIG. 9 is a section view of the pixel unit shown in FIG. 8 taken along a line B-B.

Referring to FIGS. 1, 8 and 9, the signal lines 11 extend from the display region to the non-display region. In an extension direction of one signal line 11, the signal line 11 is staggered with the non-corresponding touch electrodes 10 and is not electrically connected thereto. To be specific, in the extension direction of the signal line 11, the signal line 11 is staggered with the common electrode 1 of the above non-corresponding touch electrodes 10, so as to make the signal line 11 not electrically connected to any non-corresponding touch electrodes. The manufacturing process is shown in FIGS. 10-13.

Figure 4:
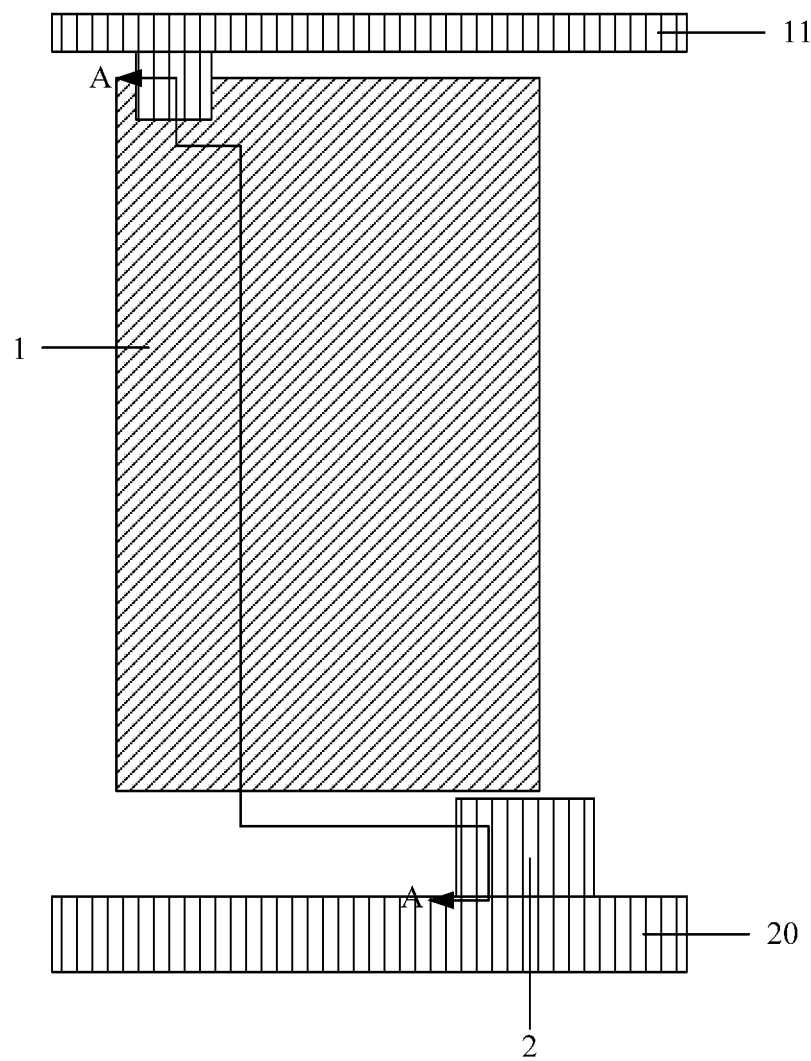
FIG. 4 and FIG. 5 are schematic views showing a process of manufacturing the pixel unit shown in FIG. 2.
Figure 6:
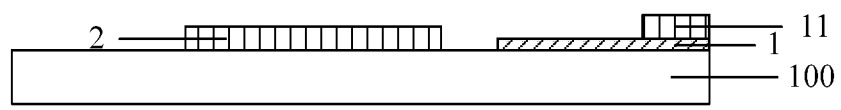
FIG. 6 is a section view of the pixel unit shown in FIG. 4 taken along a line A-A.
Figure 7:
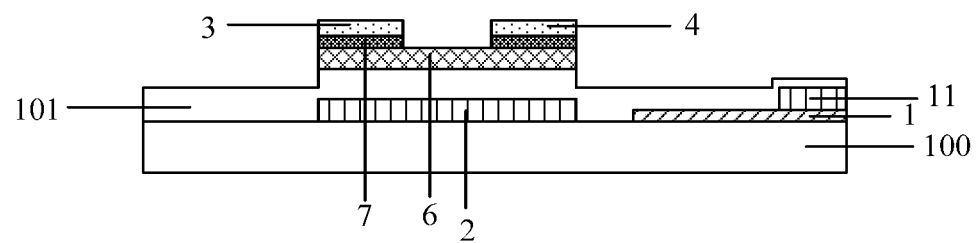
FIG. 7 is a section view of the pixel unit shown in FIG. 5 taken along a line A-A.

It should be noted that, the signal line 11 being lap-jointed to the corresponding touch electrode 10 means that there is an overlapping region between the signal line 11 and the touch electrode 10, and a portion of the signal line 11 located in the overlapping region contacts completely the portion of the touch electrode 10 located in the overlapping region. Referring to FIGS. 4 and 6, the manufacturing process may include: forming a first film layer by which the touch electrodes 10 are formed, and patterning the first film layer to from a pattern of a plurality of touch electrodes 10. To be specific, the first film layer is made of a transparent conductive material, and the first film layer is patterned to form a pattern of a plurality of common electrodes 1. The common electrodes 1 further serve as a plurality of touch electrodes 10, and each touch electrode correspond to a plurality of electrically-connected common electrodes 1.

The manufacturing process further includes: forming on the first film layer a second film layer by which the signal lines 11 are formed, patterning the second film layer to form a pattern including a plurality of signal lines 11. Each signal line 11 is lap-jointed to a corresponding touch electrode 10. To be specific, each signal line 11 is lap-jointed to one common electrode 1 of the touch electrode 10.

To be specific, the second film layer is a gate metal layer, the second film layer is patterned, so as to form simultaneously a pattern including a plurality of signal lines 11, a plurality of gate lines 20 and the gate electrode 2 of the thin film transistor. The gate electrode 2 and the gate lines are formed as an integrative structure.

In the above steps, alternatively the signal lines 11 may be formed first, and then the touch electrodes 10 may be formed.

Figure 14:
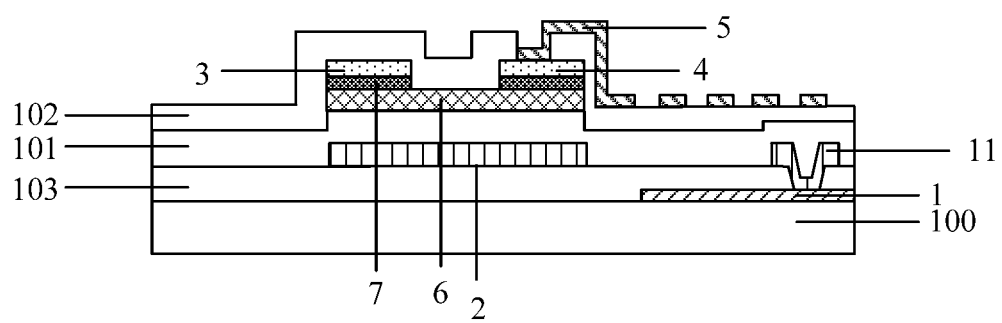
FIG. 14 is another section view of the pixel unit shown in FIG. 2 taken along a line A-A.

In some embodiments of the present disclosure, as shown in FIGS. 2 and 14, the first film layer by which the touch electrodes 10 are formed is not adjacent to the second film layer by which the signal lines 11 are formed, and an insulation layer 103 is formed between the first and the second film layers. That is, the insulation layer 103 is formed between the signal lines 11 and the touch electrodes 10, and each signal line 11 is electrically connected to a corresponding touch electrode 10 via a via-hole in the insulation layer 103. The corresponding manufacturing process may include: forming a first film layer by which the touch electrodes 10 are formed, and patterning the first film layer to from a pattern of a plurality of touch electrodes 10. To be specific, the first film layer is made of a transparent conductive material, and the first film layer is patterned to form a pattern including a plurality of common electrodes 1. The common electrodes 1 further serve as a plurality of touch electrodes 10, and each touch electrode correspond to a plurality of electrically-connected common electrodes 1.

The manufacturing process further includes forming an insulation layer 103 on the first film layer, patterning the insulation layer 103 and forming via-holes in the insulation layer 103.

The manufacturing process further includes forming on the insulation layer 103 a second film layer by which the signal lines 11 are formed, patterning the second film layer to form a pattern including a plurality of signal lines 11. Each signal line is electrically connected to a corresponding touch electrode 10 via the via-hole. To be specific, each signal line is electrically connected to a common electrode 1 of the touch electrode 10 via the via-hole. To be specific, the second film layer is a gate metal layer, the second film layer is patterned, so as to form simultaneously a pattern including a plurality of signal lines 11, a plurality of gate lines 20 and the gate electrodes 2 of the thin film transistors. The gate electrodes 2 and the gate lines are formed as an integrative structure.

Figure 15:
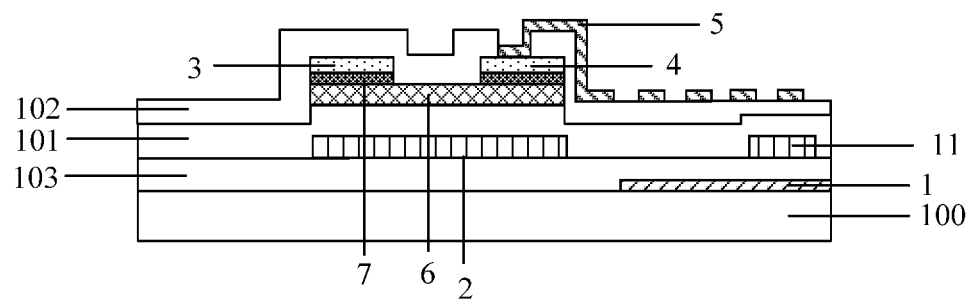
FIG. 15 is another section view of the pixel unit shown in FIG. 8 taken along a line B-B.

As shown in FIGS. 1, 8 and 15, the signal lines 11 extend from the display region to the non-display region. In an extension direction of one signal line 11, the insulation layer 103 is arranged between the signal line 11 and the non-corresponding touch electrodes 10, and the signal line 11 is not electrically connected to the non-corresponding touch electrodes 10. As compared with the structure shown in FIG. 9, in the structure shown in FIG. 15, the signal line 11 is not required to be staggered with the non-corresponding touch electrodes 10, thereby reducing the adverse influence of the signal lines 11 onto the pixel aperture ratio.

In the above steps, alternatively, the signal lines 11 may be formed first, and then the touch electrodes 10 may be formed.

In some embodiments of the present disclosure, when the ADS array substrate is a thin film transistor array substrate, the second film layer by which the signal lines 11 are formed may be a source-drain metal layer. To be specific, the data lines 30, the source electrode 3 and the drain electrode 4 of each thin film transistor, the signal lines 11 parallel to the data lines 30 may be formed simultaneously by an identical source-drain metal layer. The signal lines 11, the data lines 30, the source electrodes 3 and the drain electrodes 4 are at an identical layer and made of an identical material, and the signal lines 11 are spaced apart from the data lines 30 by a certain interval, so as to insulate the signal lines 11 from the data lines 30.

Taking a bottom-gate thin film transistor as an example, as shown in FIGS. 1-3, 8 and 9, the A-ADS type thin film transistor array substrate in some embodiments of the present disclosure includes:

a base substrate 100 (e.g., a transparent substrate such as a glass substrate, a quartz substrate, an organic resin substrate) including a plurality of pixel regions;

a plurality of common electrodes 11 on the base substrate 100, where each common electrode 1 is within one corresponding pixel region, the common electrodes further serve as a plurality of touch electrodes 10, and each touch electrode 10 corresponds to a plurality of electrically-connected common electrodes 1;

a plurality of gate lines 20, a plurality of signal lines 11 and the gate electrodes 2 of the thin film transistors, which are on the base substrate 100, where the gate lines 20, the signal lines 11 and the gate electrodes 2 are at an identical layer and made of an identical material, the signal lines 11 correspond to the touch electrodes 10 in a one-to-one manner, and each signal line 11 is lap-jointed to one of the common electrodes 1 corresponding to one touch electrode 10;

a gate insulation layer 101 on the base substrate 100;

a pattern of a source layer 6 of the thin film transistor on the gate insulation layer 101, where the source layer 6 is made of silicon semiconductor or metallic oxide semiconductor;

an ohmic contact layer 7 on the source layer 6;

a plurality of data lines 30, the source electrodes 3 and the drain electrodes 4 of the thin film transistors on the base substrate 100, where the gate lines 20 cross the data lines 30, so as to define regions of the pixel units, each source electrode 3 and drain electrode 4 are lap-jointed to the active layer 6 at two sides thereof opposite to each other via the ohmic contact layer 7, and the ohmic contact layer 7 is configured to reduce a contact resistance between the semiconductor layer 6 and the source electrode as well as the drain electrodes;

a passivation layer 102 covering the thin film transistors, where the passivation layer 102 includes via-holes; and the pixel electrodes 5 on the passivation layer 102, where each pixel electrode 5 is electrically connected to the drain electrode 4 of the thin film transistor via the via-hole in the passivation layer 102.

Referring to FIG. 1, FIGS. 2-7 and FIGS. 8-13, a method for manufacturing the A-ADS thin film transistor array substrate hereinabove includes following steps.

Step 1 is to provide a base substrate 100 including a plurality of pixel regions.

Step 2 is to form a plurality of common electrodes 1 on the base substrate 100, where each common electrode 1 is within a corresponding pixel region, the common electrodes 1 further serve as a plurality of touch electrodes 10, the common electrodes 1 corresponding to each touch electrodes 10 are electrically connected to each other via connection lines, and the connection lines and the common electrodes 10 are formed as an integrative structure, as shown in FIGS. 4 and 6.

The common electrodes 1 are made of a transparent conductive material such as indium tin oxide or indium zinc oxide.

To be specific, this step includes: forming a transparent conductive layer on the base substrate 100 by physical deposition, chemical sputtering or other film forming methods; coating photoresist on the transparent conductive layer, exposing and developing the photoresist to form a photoresist reserved region and a photoresist unreserved region, where the photoresist reserved region corresponds to a region of the common electrodes and the connection lines, and the photoresist unreserved region corresponds to other regions; removing the transparent conductive layer at the photoresist unreserved region by taking the unreserved photoresist as a mask; removing the rest of the photoresist and forming a pattern including the common electrodes 1 and the connection lines, where two ends of each connection line are connected to adjacent two common electrodes 1 respectively, so as to electrically contact the common electrodes 1 corresponding to the touch electrode 10.

Figure 5:
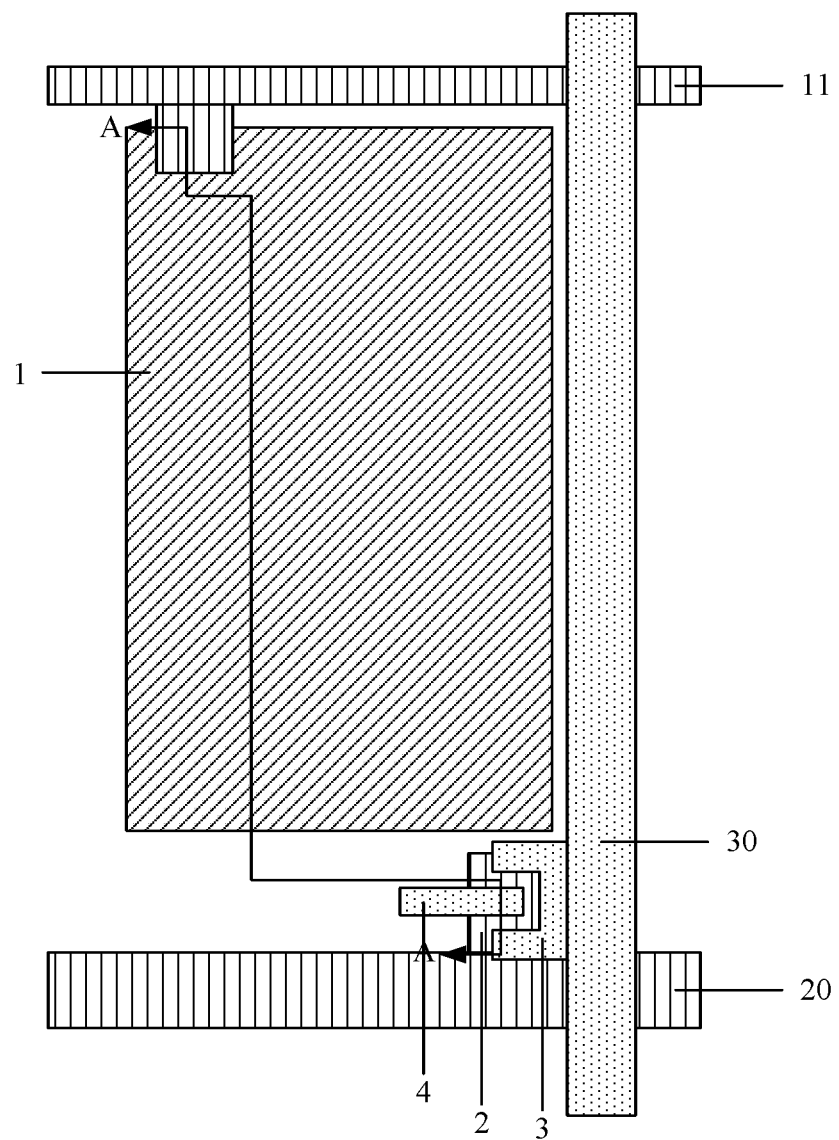
Figure 10:
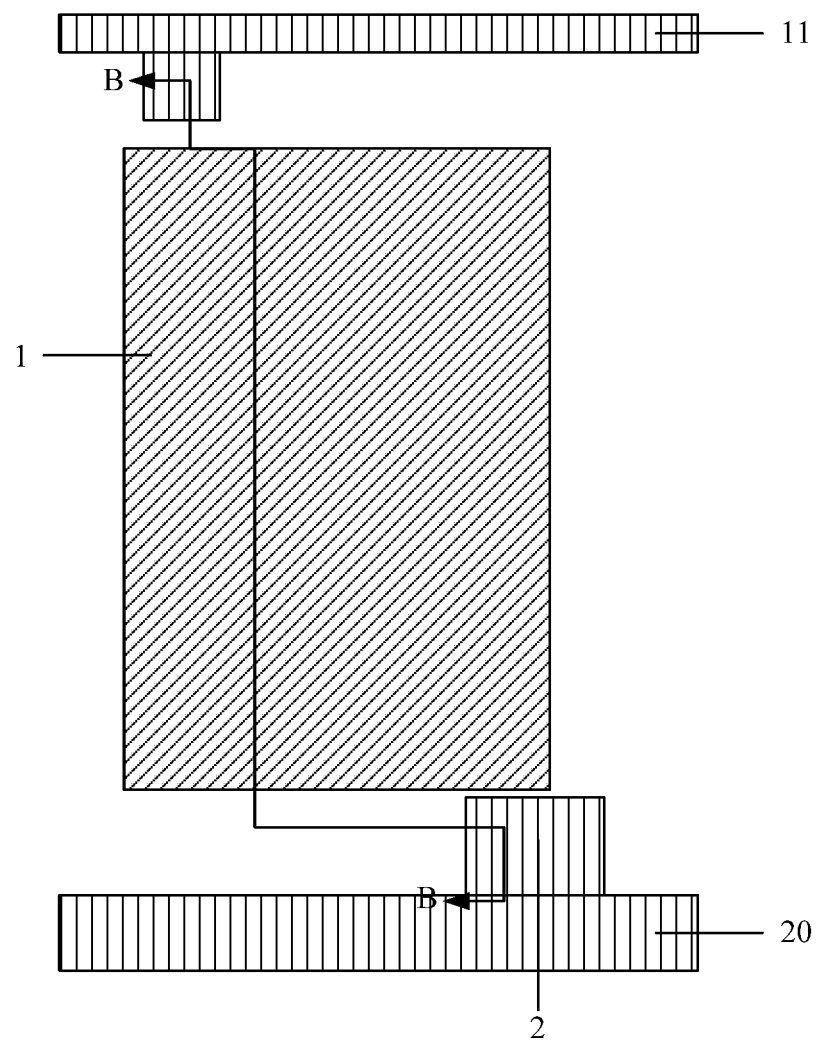
FIG. 10 and FIG. 11 are schematic views showing a process of manufacturing the pixel unit shown in FIG. 8.
Figure 11:
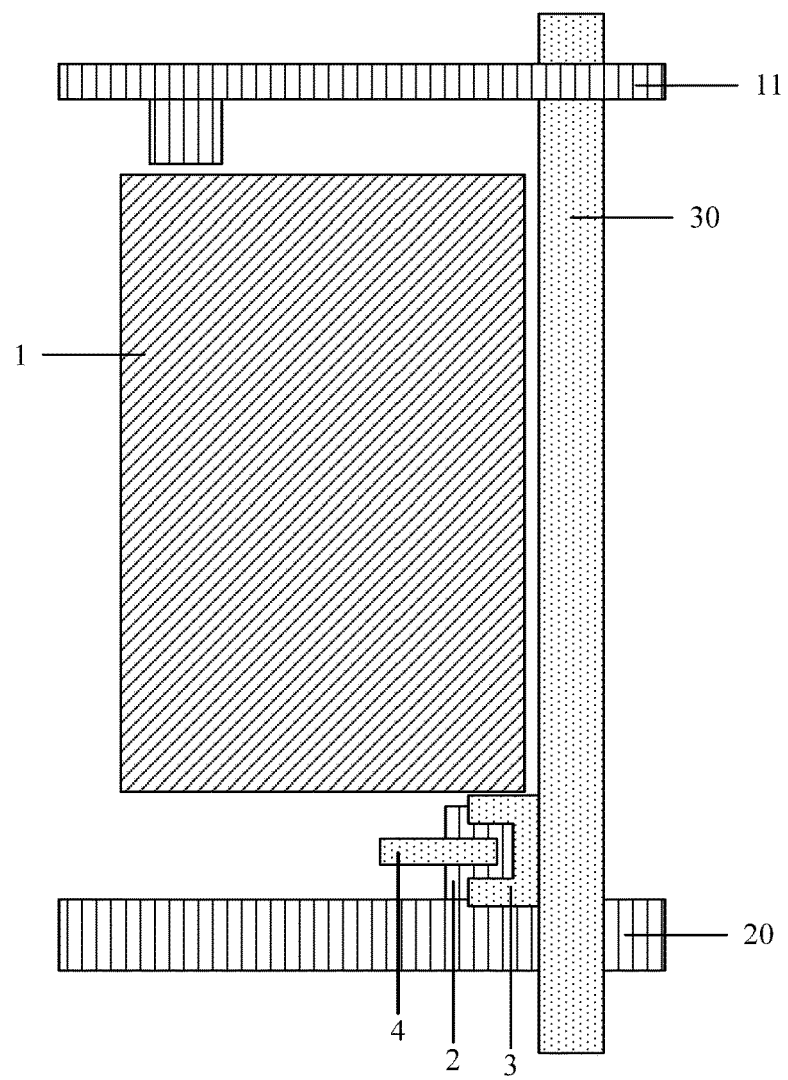
Figure 12:
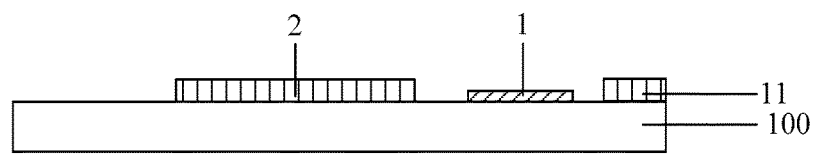
FIG. 12 is a section view of the pixel unit shown in FIG. 10 taken along a line B-B.
Figure 13:
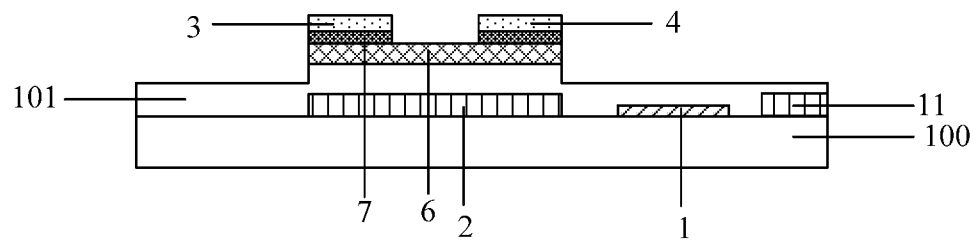
FIG. 13 is a section view of the pixel unit shown in FIG. 11 taken along a line B-B.

Step 3 is to form a gate metal layer on the base substrate 100 and pattern the gate metal layer to form a plurality of gate lines 20, a plurality of signal lines 11 and the gate electrodes 2 of the thin film transistors, where the signal lines 11 are parallel to the gate lines 20 and extend from the display region to the non-display region, one end of each signal line 11 is lap-jointed to a common electrode 1 corresponding to the touch electrode 10 so as to be electrically connected to the corresponding touch electrode, as shown in FIGS. 4-6. Each signal line 11 is staggered with the non-corresponding touch electrodes 10 so as to be insulated from the touch electrode 10. That is, in the extension direction of the signal line 11, the signal line 11 is staggered with the common electrode 1 of the above non-corresponding touch electrodes 10 by a certain interval, as shown in FIGS. 10-12.

The gate metal layer may be Cu, Al, Ag, Mo, Cr, Nd, Ni, Mn, Ti, Ta, W or an alloy of these metals. The gate metal layer may be a single layer structure or a multi-layer structure. The multi-layer structure may be Cu\Mo, Ti\Cu\Ti, Mo\Al\Mo.

Step 4 is to form a gate insulation layer 101 on the base substrate 100, as shown in FIGS. 5, 7 and FIGS. 11, 13.

The gate insulation layer 101 may be made of an oxide, a nitride or a nitric oxide and may be of a single layer structure, a double layer structure or a multi-layer structure. To be specific, the gate insulation layer may be made of SiNx, SiOx or Si(ON)x.

Step 5 is to form a pattern of an active layer 6 of the thin film transistor on the base substrate 100, as shown in FIGS. 5, 7 and FIGS. 11, 13.

The source layer 6 may be made of a silicon semiconductor or a metallic oxide semiconductor (e.g., indium tin oxide or indium zinc oxide).

Step 6 is to form an ohmic contact layer and source-drain metal layer in sequence on the base substrate 100, coat photoresist on the source-drain metal layer, expose and develop the photoresist to form photoresist reserved region and a photoresist unreserved region, etch the source-drain metal layer and the ohmic contact layer at the photoresist unreserved region and remove the rest of photoresist to form a pattern of the ohmic contact layer 7, the source electrodes 3 and the drain electrodes 4, where the source electrodes 3 and the drain electrodes 4 are lap-jointed to two sides of the active layer 6 opposite to each other via the ohmic contact layer 7, as shown in FIGS. 5, 7 and FIGS. 11, 13.

The source-drain metal layer may be Cu, Al, Ag, Mo, Cr, Nd, Ni, Mn, Ti, Ta, W or an alloy of these metals. The source-drain metal layer may be a single layer structure or a multi-layer structure. The multi-layer structure may be Cu\Mo, Ti\Cu\Ti, Mo\Al\Mo.

Step 7 is to form a passivation layer 102 on the base substrate 100 and pattern the passivation layer to form via-holes, as shown in FIGS. 2, 3 and FIGS. 8, 9.

The passivation layer 102 may be made of an oxide, a nitride or a nitric oxide and may be of a single layer structure, a double layer structure or a multi-layer structure. To be specific, the passivation layer may be made of SiNx, SiOx or Si(ON)x.

Step 8 is to form pixel electrodes 5 on the base substrate 100, where each pixel electrode 5 is electrically connected to the drain electrode 4 of the thin film transistor via the via-hole in the passivation layer 102, as shown in FIGS. 2, 3 and FIGS. 8, 9

The pixel electrodes 5 are made of a transparent conductive material such as indium tin oxide or indium zinc oxide.

Finally, a manufacturing of the array substrate is completed.

A display device is further provided in some embodiments of the present disclosure, including the ADS array substrate hereinabove, thereby realizing an in-cell type touch screen and thinning the display device. In addition, it is able to avoid the "ghost point" which occurs in the self-capacitance touch screen of the related art, thereby shortening the touch detection time length and improving the touch sensitivity.

For example, the display device may be any product or component having a display function, such as a liquid crystal panel, a cell phone, a tablet PC, a television, a displayer, a laptop computer, a digital photo frame and a navigator.

According to the embodiments of the present disclosure, the common electrodes further serve as the touch electrodes, thereby realizing an in-cell type touch screen and thinning the display device. Each touch electrode is electrically connected to a corresponding signal line. In the touch time period of the time period for displaying one frame of image, it is detected whether a self-capacitance of the touch electrode is changed via a corresponding signal line and then a touch position is determined. In addition, each signal line corresponds to a unique touch electrode, so even though a plurality of touch electrodes are touched, the corresponding touch positions may be determined exactly, thereby avoiding the "ghost points" occurring in the self-capacitance touch detection of the related art. In addition, the self-capacity of all the touch electrodes may be detected simultaneously, as compared with the touch detection in the related art in which the horizontal touch electrodes and the longitudinal touch electrodes in the touch electrodes are detected in sequence, therefore a detection time length is shortened and a touch sensitivity is improved.

The above are merely the preferred embodiments of the present disclosure. A person skilled in the art may make further modifications and replacements without departing from the principle of the present disclosure, and these modifications and replacements shall also fall within the scope of the present disclosure.

What is claimed is:

1. An advanced super dimension switch (ADS) array substrate, comprising:
   a display region, and
   a non-display region at a periphery of the display region;
   wherein the display region of the array substrate comprises a plurality of pixel units, and each of the pixel units comprises a common electrode and a pixel electrode;
   wherein a time period for displaying one frame of image of the array substrate comprises a display time period and a touch time period; the common electrodes further serve as a plurality of touch electrodes, and each of the touch electrodes corresponds to a plurality of ones of the common electrodes which are electrically connected to each other;
   wherein the array substrate further comprises a plurality of signal lines; the signal lines are electrically connected to the touch electrodes in a one-to-one manner;
   wherein each of the signal lines is configured to transmit a common voltage signal to the corresponding touch electrode within the display time period of the time period for displaying one frame of image; and each of the signal lines is further configured to detect whether there is a change of a self-capacitance of the corresponding touch electrode within the touch time period of the time period for displaying one frame of image;
   wherein the array substrate is a thin film transistor array substrate, and comprises gate lines and data lines which are intersected to each other and configured to define regions of the pixel units;
   wherein each of the pixel units further comprises a thin film transistor; the signal lines, the gate lines, and gate electrodes of the thin film transistors are at an identical layer and made of an identical material, or, the signal lines, the data lines, source electrodes and drain electrodes of the thin film transistors are at an identical layer and made of an identical material;
   wherein each of the signal lines is lap-jointed to the corresponding touch electrode and electrically contacts the corresponding touch electrode;
   wherein the array substrate comprises:
      a base substrate;
      the common electrodes on the base substrate;
      the gate lines, the signal lines and the gate electrodes of the thin film transistors, which are at an identical layer and made of an identical material; wherein each of the signal lines is lap-jointed to the corresponding touch electrode;
      a gate insulation layer covering the gate lines, the signal lines and the gate electrodes;
      a pattern of an active layer on the gate insulation layer;
      the data lines, the source electrodes and the drain electrodes of the thin film transistors, wherein in each of the thin film transistors, the source electrode and the drain electrode are lap-jointed to the active layer at two sides thereof opposite to each other;
      a passivation layer covering the thin film transistors, wherein the passivation layer comprises via-holes; and
      the pixel electrodes on the passivation layer and in electrical connection with the drain electrodes via the via-holes in the passivation layer.

2. The array substrate according to claim 1, further comprising an insulation layer between the signal lines and the touch electrodes; wherein each of the signal lines is electrically connected to the corresponding touch electrode via a via-hole in the insulation layer.

3. The array substrate according to claim 1, wherein a portion of each of the signal lines in the display region is parallel to the gate lines or the data lines.

4. The array substrate according to claim 1, wherein each of the common electrodes is a plate electrode, and each of the pixel electrodes is a slot electrode.

5. The array substrate according to claim 1, wherein the signal lines extend from the display region to the non-display region; the array substrate is of a rectangular structure, and the signal lines extend from the display region to a side of a longer edge of the array substrate.

6. A display device, comprising the advanced super dimension switch (ADS) array substrate according to claim 1.

7. An advanced super dimension switch (ADS) array substrate, comprising:
   a display region, and
   a non-display region at a periphery of the display region;
   wherein the display region of the array substrate comprises a plurality of pixel units, and each of the pixel units comprises a common electrode and a pixel electrode;
   wherein a time period for displaying one frame of image of the array substrate comprises a display time period and a touch time period; the common electrodes further serve as a plurality of touch electrodes, and each of the touch electrodes corresponds to a plurality of ones of the common electrodes which are electrically connected to each other;
   wherein the array substrate further comprises a plurality of signal lines; the signal lines are electrically connected to the touch electrodes in a one-to-one manner;
   wherein each of the signal lines is configured to transmit a common voltage signal to the corresponding touch electrode within the display time period of the time period for displaying one frame of image; and each of the signal lines is further configured to detect whether there is a change of a self-capacitance of the corresponding touch electrode within the touch time period of the time period for displaying one frame of image,
   wherein the array substrate is a thin film transistor array substrate, and comprises gate lines and data lines which are intersected to each other and configured to define regions of the pixel units;
   wherein each of the pixel units further comprises a thin film transistor; the signal lines, the gate lines, and gate electrodes of the thin film transistors are at an identical layer and made of an identical material, or, the signal lines, the data lines, source electrodes and drain electrodes of the thin film transistors are at an identical layer and made of an identical material;
   wherein each of the pixel electrodes comprises a plurality of slots; the slots comprise a plurality of first slots which are parallel to each other and a plurality of second slots which are parallel to each other; an angle is defined between the gate lines and the first slots, and between the gate lines and the second slots;
   in each of the pixel electrodes, the first slots and the second slots are symmetrically distributed at two sides of a center axis of each of the pixel electrodes which is parallel to the gate lines.

8. A method for manufacturing an advanced super dimension switch (ADS) array substrate, wherein the array substrate comprises a display region and a non-display region at a periphery of the display region; wherein the method comprises a step of forming a plurality of pixel units in the display region of the array substrate with each of the pixel units comprising a common electrode and a pixel electrode; wherein a time period for displaying one frame of image of the array substrate comprises a display time period and a touch time period; the common electrodes further serve as a plurality of touch electrodes, and each of the touch electrodes corresponds to a plurality of ones of the common electrodes which are electrically connected to each other;

wherein the method further comprises: forming a plurality of signal lines with the signal lines in electrical connection with the touch electrodes in a one-to-one manner;

wherein each of the signal lines is configured to transmit a common voltage signal to the corresponding touch electrode within the display time period of the time period for displaying one frame of image; and each of the signal lines is further configured to detect whether there is a change of a self-capacitance of the corresponding touch electrode within the touch time period of the time period for displaying one frame of image;

wherein the step of forming a plurality of pixel units comprises:

providing a base substrate;

forming a plurality of common electrodes on the base substrate:

wherein the step of forming a plurality of signal lines comprises:

forming a gate metal layer on the common electrodes, and patterning the gate metal layer to form a plurality of gate lines, a plurality of signal lines and gate electrodes of thin film transistors, wherein each of the signal lines is lap-jointed to the corresponding touch electrode;

the method further comprises:

forming a gate insulation layer covering the gate lines, the signal lines and the gate electrodes;

forming a pattern of an active layer on the gate insulation layer;

forming a source-drain metal layer on the active layer, and pattering the source-drain metal layer to form a plurality of data lines, source electrodes and drain electrodes of the thin film transistors, wherein in each of the thin film transistors, the source electrode and the drain electrode are lap-jointed to the active layer at two ends thereof opposite to each other;

forming a passivation layer covering the thin film transistors, and patterning the passivation layer to form via-holes therein; and forming the pixel electrodes on the passivation layer, wherein the pixel electrodes are electrically connected to the drain electrodes via the via-holes in the passivation layer.

9. The method according to claim 8, wherein the array substrate is a thin film transistor array substrate, and comprises gate lines and data lines which are intersected to each other and configured to define regions of the pixel units; wherein each of the pixel units further comprises a thin film transistor;

wherein the step of forming a plurality of signal lines comprises:

patterning an identical gate metal layer to form the signal lines, gate lines, and gate electrodes of the thin film transistors, or patterning an identical source-drain metal layer to form the signal lines, data lines, source electrodes and drain electrodes of the thin film transistors.

10. The method according to claim 8, wherein the step of forming a plurality of pixel units comprises: forming a transparent conductive layer and patterning the transparent conductive layer to form a plurality of common electrodes;

wherein the step of forming a plurality of signal lines comprises: forming a gate metal layer on the common electrodes and patterning the gate metal layer to form a pattern comprising the signal lines, gate lines and gate electrodes of thin film transistors;

wherein each of the signal lines is lap-jointed to the corresponding touch electrode and in electrical connection with the corresponding touch electrode.

11. The method according to claim 8, wherein the step of forming a plurality of pixel units comprises: forming a transparent conductive layer and patterning the transparent conductive layer to form a plurality of common electrodes;

the method further comprises: forming an insulation layer on the common electrodes and patterning the insulation layer to form via-holes therein;

wherein the step of forming a plurality of signal lines comprises: forming a gate metal layer on the insulation layer, and patterning the gate metal layer to form a pattern including the signal lines, gate lines and gate electrodes of thin film transistors;

wherein each of the signal lines is electrically connected to the corresponding touch electrode via the via-hole in the insulation layer.

* * * * *